United States Patent [19]

La Flame

[11] 3,739,891
[45] June 19, 1973

[54] VISCOUS FLUID CLUTCH
[75] Inventor: Frank E. La Flame, Dayton, Ohio
[73] Assignee: General Motors Corporation, Detroit, Mich.
[22] Filed: Mar. 13, 1972
[21] Appl. No.: 234,066

[52] U.S. Cl. .............................. 192/58 C, 192/82 T
[51] Int. Cl. ............................................. F16d 35/00
[58] Field of Search ...................... 192/58 C, 82 T

[56] References Cited
UNITED STATES PATENTS

| | | | |
|---|---|---|---|
| R25,481 | 11/1963 | Weir | 192/58 C |
| 2,838,244 | 6/1958 | Oldberg | 192/58 C |
| 3,019,875 | 2/1962 | Fowler | 192/58 C |
| 3,101,825 | 8/1963 | Caroli et al. | 192/58 C X |

Primary Examiner—Allan D. Hermann
Attorney—Warren E. Finken, A. M. Heiter and John P. Moran

[57] ABSTRACT

The drawings illustrate an improved viscous fluid clutch including a rotatable housing having an enclosed working chamber, an engine-driven clutch plate and a control plate mounted in the working chamber, spring means connecting the control plate to the housing such that the housing rotates with the control plate and the control plate is able to move axially within the housing toward the clutch plate in response to the action of a temperature-responsive wax-filled power element to effectuate a fluid shear drive relationship therewith, with a substantially constant fluid level being maintained during all operative conditions.

8 Claims, 6 Drawing Figures

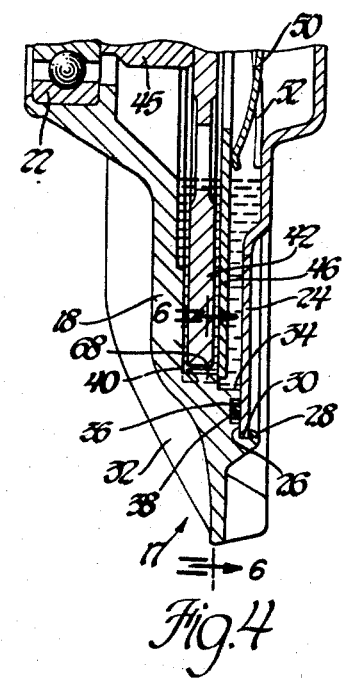
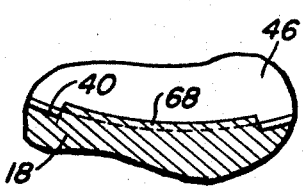
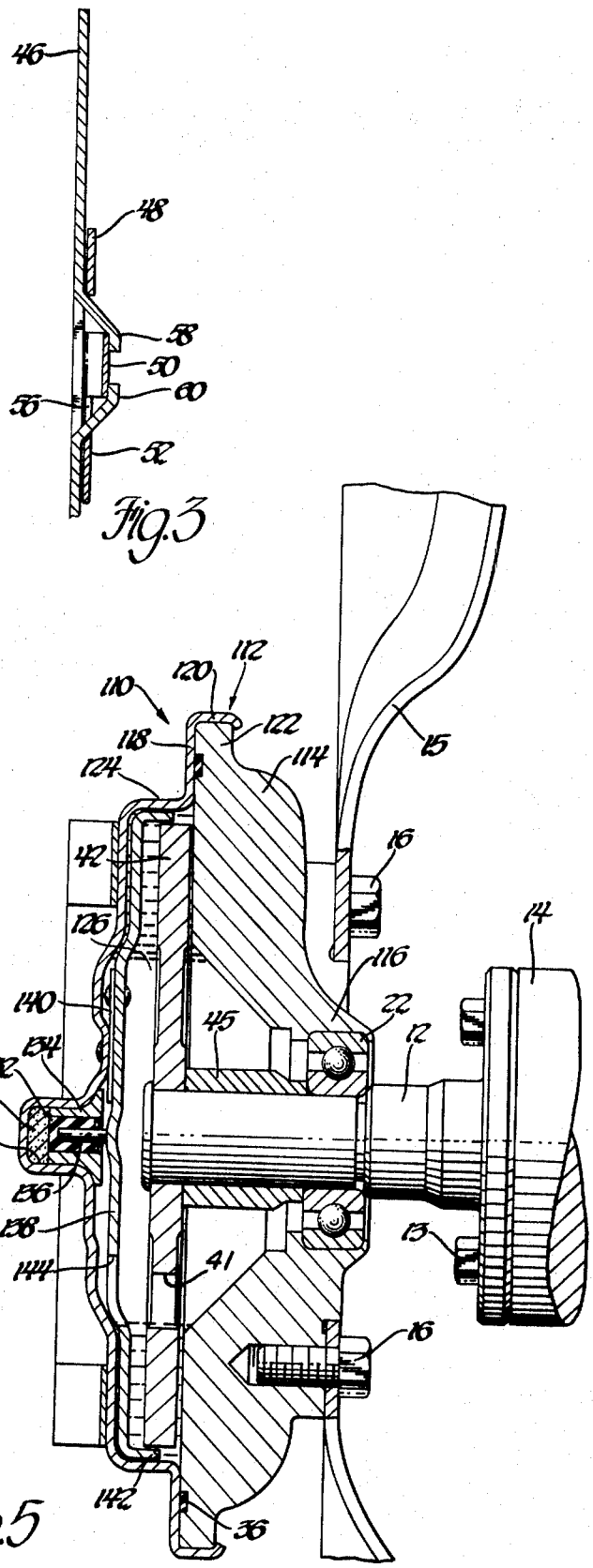

VISCOUS FLUID CLUTCH

This invention relates generally to variable speed drive devices, and more particularly, to a viscous fluid drive adapted to drive an accessory device, such as a cooling fan, for an internal combustion engine.

Vehicle cooling fans are generally belt-driven from the engine crankshaft, and are operable at a fixed speed ratio with respect to the vehicle engine. It has been found desirable to vary the speed ratio of the fan with respect to the engine speed so that at low engine speed the fan will be running at a relatively high speed for maximum cooling and as the speed of the engine increases, such as when the vehicle is running in direct drive at road speeds, the ram air cooling effect on the engine is increased and the necessity for fan cooling is diminished. The resultant lower fan speed eliminates excessive fan noise which otherwise could be disturbing to the occupants of the vehicle.

The device disclosed herein relates to an engine cooling fan mechanism wherein an improved viscous fluid, shear-type clutch is utilized to transmit power from the vehicle engine to the fan blade assembly.

An object of the invention is to provide an improved viscous shear fan drive wherein a temperature-responsive, axially movable control plate at times forms a fluid shear space with the usual clutch plate while maintaining a substantially constant fluid level at all times.

Another object of the invention is to provide an improved simplified viscous fluid clutch arrangement embodying efficient cooperating resilient and abutment means for engaging and disengaging the fluid shear drive relationship between a driving clutch plate and a control plate movably secured to a driven housing having an attached cooling fan in response to changes in ambient temperature and without having to raise and/or lower the fluid medium level.

A further object of the invention is to provide an improved viscous shear fan drive having a housing including a rear wall, a front wall, an operating or working chamber formed between the rear and front walls for receiving a clutch plate and a control plate, the latter being connected by a tri-leaf spring mounting means to the rear wall for rotation therewith and being axially movable toward and away from the clutch plate to at times form a shear space therebetween to effectuate an engaged mode between the clutch plate and the housing, and temperature-responsive means for deforming the tri-leaf spring mounting means and thereby moving the control plate in response to changes in ambient temperature.

These and other objects and advantages will become apparent when reference is made to the following description and accompanying drawings, wherein:

FIG. 3 is a cross-sectional view taken on the plane of lines 3—3 of FIG. 2, and looking in the direction of the arrows;

FIG. 4 is a fragmentary cross-sectional view of a portion of the FIG. 1 structure in a different operational position;

FIG. 5 is a cross-sectional view of an alternate embodiment of the invention; and FIG. 6 is a fragmentary cross-sectional view taken on the plane of line 6—6 of FIG. 4, and looking in the direction of the arrows.

Figure 1:
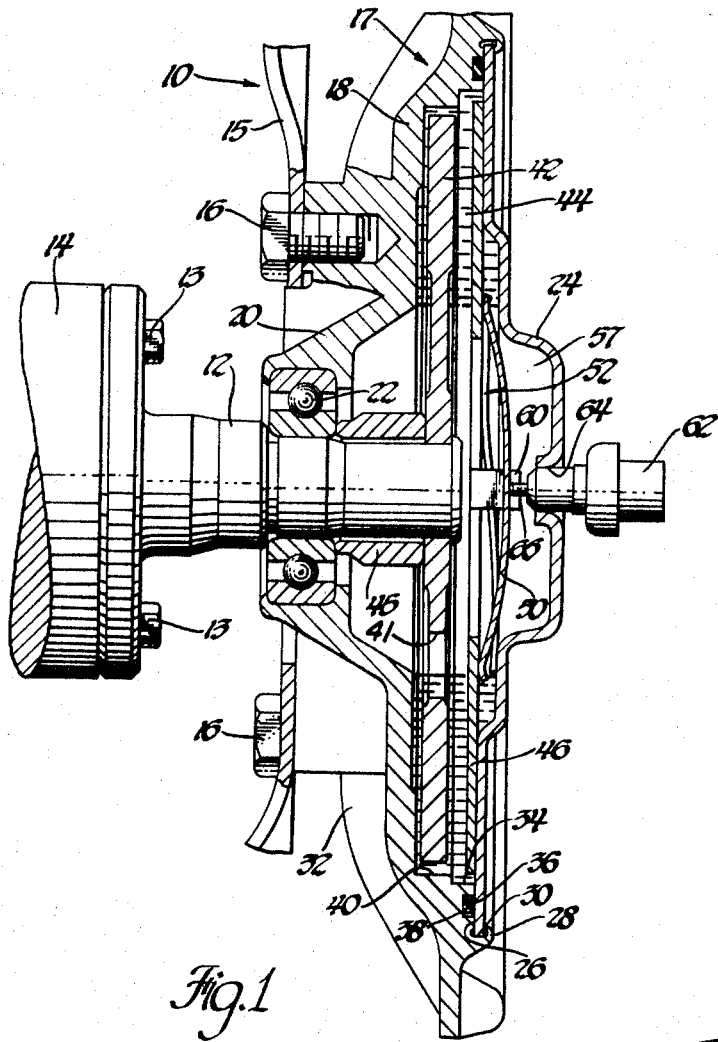
FIG. 1 is a cross-sectional view of a viscous fluid, shear-type clutch embodying the invention.

Referring now to the drawings in greater detail, FIG. 1 illustrates a viscous fluid clutch 10 including a flanged shaft 12 secured by bolts 13 to a suitable drive shaft 14 extending from a vehicular engine (not shown) for driving a cooling fan 15 secured to the clutch 10 by bolts 16. The fluid clutch 10 includes a housing 17 which includes a rear wall member 18 having a hub 20 which is rotatably mounted by a suitable bearing 22 on the drive shaft 12. The housing 17 further includes a cover member or front wall 24 which has an annular flat surface 26 formed adjacent its peripheral edge, the latter being confined by an annular lip 28 in an annular recess 30 formed in the housing 17. Cooling fins 32 are formed on the outer surface of the rear wall member 18.

A second annular recess 34 is formed radially inwardly of the outer periphery of the annular recess 30. A seal 36 is compressed in an annular groove 38 formed in the rear wall member 18 intermediate the outer edges of the annular recesses 30 and 34. A third annular deeper recess 40 is formed in the rear wall member 18 radially inwardly of the second annular recess 34. A clutch plate 42 is secured at its center by any suitable means to the drive shaft 12, one face and the outer peripheral portion thereof being freely located in respective spaced relationships with the rear wall member 18 and the third annular recess 40 in an operating or working chamber 44 formed between the rear wall member 18 and the cover member 24. A spacer 45 is mounted around the shaft 12 intermediate the clutch plate 42 and the bearing 22.

Figure 2:
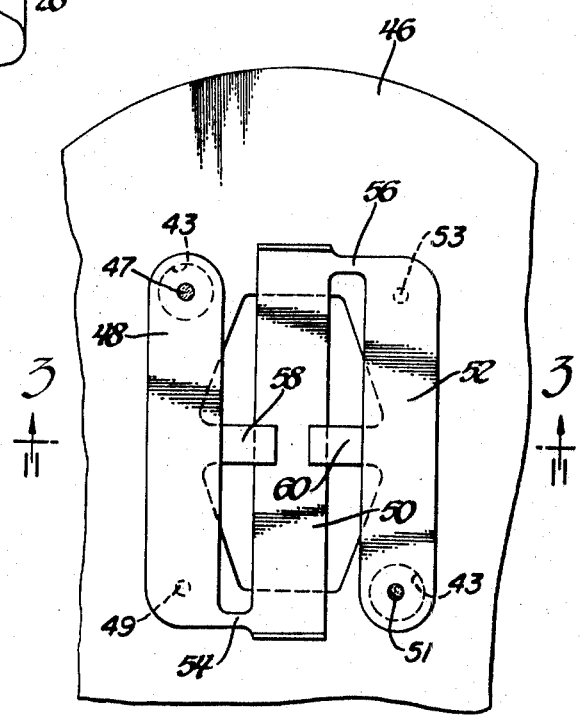
FIG. 2 is an enlarged end view of a portion of the FIG. 1 structure.

A control plate 46 is mounted in the working chamber 44 intermediate the clutch plate 42 and the end cover 24. Openings 41 are formed in the clutch plate 42, and openings 43 are formed in the control plate 46. Three equally spaced, parallel spring members 48, 50, and 52 serve to resiliently connect the control plate 46 to the end cover 24. Specifically, the two outside spring members 48 and 52 are each connected at one end thereof, 47 and 51 (FIG. 2), to the end cover 24 and at the respective other ends thereof, 49 and 53, to the control plate 46. A pair of oppositely disposed straps 54 and 56 interconnect between the respective control plate-connected ends of the two outside spring members 48 and 52 and the respective adjacent ends of the center spring member 50, causing the ends of the latter spring member to maintain contact with the control plate 46 (FIG. 1). The center spring member 50 is bowed intermediate its ends away from the control plate 46 and into a pocket 57 formed in the end cover 24. Two retainer brackets 58 and 60, formed on the control plate 46 (FIG. 3), serve to preload and limit the outermost bowed position of the center spring member 50.

A conventional stock-item wax-filled power element 62 is mounted in an opening 64 formed in the center of the end cover 24. A pushrod 66 extends from the power element 62 into the working chamber 44 into contact with the midpoint of the bowed center spring member 50. The wax contained in the power element 62 is of such a consistency that it changes from a solid to a liquid in response to changes in ambient temperature over a predetermined temperature range, and in doing so undergoes a change in volume of approximately 10 percent. Such change in volume causes the pushrod 66 to protrude farther out of the power element 62, thus urging the center spring member 50 and, hence, the control plate 46, toward the clutch plate 42. This also bends the outer spring members 48 and 52 away from the end cover 24.

The clutch plate 42 is generally mounted apart from the rear wall 18 a sufficient distance so that the housing 17 is in a disengaged relationship with respect to the clutch plate 42. Now, as ambient temperature increases and the solid wax melts, increasing in volume, the pushrod 66 is forced outwardly from the power element 62, thereby moving the control plate 46 closer to the clutch plate 42. The fully engaged mode is attained when the control plate 46 contacts three equally spaced arcuate abutments 68 (FIG. 4) formed on the side walls of the recess 40. At this point, the fluid shear space between the plates 42 and 46 is approximately .008 inch. The resultant viscous fluid drive therebetween causes the rotational speed of the housing 17 and the associated cooling fan 15 to approach the speed of the input shaft 12. In the event of any additional expansion of the wax after the control plate 46 contacts the abutments 68, the center spring 50 will deform to accommodate any over-travel of the pushrod 66.

It should be noted that, with the control plate 46 in contact with the abutments 68, fluid displaced from between the plates 42 and 46 is free to flow around the outer periphery of the control plate 42, intermediate the abutments 68, as well as through the respective openings 41 and 43. Thus it may be realized that the fluid level in the working chamber 44 remains substantially constant during the lateral movement of the control plate 46.

As ambient temperature decreases, the wax in the power element 62 solidifies, the tensioned spring members 48 and 52 urge the control plate 46 away from the clutch plate 42 toward the end cover 24, forcing the pushrod 66 back into the power element 62 into the space now made available by the solidified wax, thus returning the clutch plate 42 and the housing 17 to a disengaged relationship at a time when the cooling fan is not needed.

FIG. 5 EMBODIMENT

FIG. 5 illustrates a viscous fluid clutch 110, many of the elements of which are substantially the same as the comparable elements of the FIG. 1 structure and bear the same reference numerals. The housing 112 includes a rear wall member 114 having a hub 116 which is rotatably mounted on the bearing 22, and a forward wall or cover member 118 having an outer cylindrical portion 120 which is formed to mount around and rotate with an outwardly extending flanged portion 122 formed on the rear wall member 114. The cover member 118 further includes an intermediate cylindrical portion 124 which forms a working chamber 126 with the rear wall member 114, in which the clutch plate 42 is rotatably mounted.

A third cylindrical chamber 128 is formed in the end cover 118, housing a predetermined volume of wax 130, a rubber member 132 movably mounted in a fixed bushing 134, and a pushrod 136 mounted in the rubber member 132 and extending into the working chamber 126, in contact with a control plate 138. Three equally spaced leaf springs 140 are riveted at one end thereof to the control plate 138, and at the other end thereof to the end cover 118. A cylindrical flange 142 is formed on the outer periphery of the control plate 138, extending past the adjacent edge of the clutch plate 42. A plurality of openings 144 are formed in the control plate 138.

In operation, as the wax 130 melts at a predetermined ambient temperature, the rubber member 132 and the pushrod 136 are forced outwardly from the chamber 128, due to the expanding volume of the wax 130, thus moving the control plate 138, against the force of the springs 140, toward the clutch plate 42, until the leading edge of the cylindrical flange 142 contacts the rear wall member 114. As the control plate 138 moves in this manner, the fluid between the plates 42 and 138 moves through the openings 144, as well as through the openings 41 of the clutch plate 42, and past the flange 142 to remain at a substantially constant level.

The control plate 138 will have thus moved close enough to the clutch plate 42 to define a predetermined fluid shear space therebetween, causing the rotational speed of the control plate 138, and, via the springs 140, the housing 112 and the cooling fan 15 to approach the speed of the clutch plate 42 and the input shaft 12.

As with the clutch 10, as ambient temperature decreases, the wax 130 in the chamber 128 solidifies, the tensioned spring members 140 urge the control plate 138 away from the clutch plate 42 toward the end cover 118, forcing the pushrod 136 back into the chamber 128 into the space now made available by the solidified wax, thus returning the clutch plate 42 and the housing 112 to a disengaged relationship at a time when the cooling fan 15 is not needed.

It should be apparent that the invention provides an improved, simplified viscous fluid clutch arrangement embodying efficient cooperating resilient and abutment means for engaging and disengaging the fluid shear drive relationship between a driving clutch plate and a control plate movably secured to a driven housing having an attached cooling fan in response to changes in ambient temperature and without having to raise and/or lower the fluid medium level.

While but two embodiments of the invention have been shown and described, other modifications thereof are possible.

I claim:

1. A viscous fluid clutch comprising first and second relatively rotatable drive means, said first drive means forming an annular enclosed working chamber, a predetermined volume of viscous fluid medium in said working chamber, said second drive means being mounted in said working chamber, third drive means mounted in said working chamber and connected to said first drive means for rotation therewith and being axially movable with respect thereto, resilient means interconnecting said first and third drive means and urging said third drive means away from said second drive means, a control unit mounted on said first drive means and having a projection extending therefrom, temperature-responsive means in said control unit for moving said projection in response to changes in ambient temperature to contact said resilient means and thereby urge said third drive means toward said second drive means, and abutment means formed on one of said first or third drive means for stopping the movement of said third drive means adjacent said first drive means so as to form a fluid shear space therebetween, said abutment means permitting fluid displaced by said temperature-responsive movement of said third drive means to flow past said third drive means so that said viscous fluid medium maintains a substantially constant operative fluid level in said working chamber for all axial positions of said third drive means.

2. A viscous fluid clutch comprising first and second relatively rotatable drive means, said first drive means forming an annular enclosed working chamber, a predetermined volume of viscous fluid medium in said working chamber, said second drive means being mounted in said working chamber, third drive means mounted in said working chamber and connected to said first drive means for rotation therewith and being axially movable with respect thereto, resilient means interconnecting said first and third drive means and urging said third drive means away from said second drive means, a wax-filled power element mounted on said first drive means and having a projection extending therefrom, said projection being movable in response to changes in ambient temperature to contact said resilient means and thereby urge said third drive means toward said second drive means, and abutment means formed on one of said first or third drive means for stopping the movement of said third drive means adjacent said first drive means so as to form a fluid shear space therebetween, said abutment means permitting fluid displaced by said temperature-responsive movement of said third drive means to flow past said third drive means so that said viscous fluid medium maintains a substantially constant operative fluid level in said working chamber for all axial positions of said third drive means.

3. A viscous fluid clutch comprising a relatively rotatable housing and clutch plate, said housing forming an annular enclosed working chamber, a predetermined volume of viscous fluid medium in said working chamber, said clutch plate being mounted in said working chamber, a control plate mounted in said working chamber and connected to said housing for rotation therewith and being axially movable with respect thereto, leaf spring means interconnecting said housing and said control plate and urging said control plate away from said clutch plate, a wax-filled power element mounted on said housing and having a pushrod extending therefrom, said pushrod being operable in response to changes in ambient temperature to contact said leaf spring means and thereby urge said control plate toward said clutch plate, and abutment means formed on one of said housing or said control plate in said working chamber for stopping the movement of said control plate adjacent said clutch plate so as to form a predetermined minimum fluid shear space therebetween, said abutment means permitting fluid displaced by said temperature-responsive movement of said control plate to flow past said control plate so that said viscous fluid medium maintains a substantially constant fluid level in said working chamber for all axial positions of said control plate.

4. The viscous fluid clutch described in claim 3, wherein said leaf spring means includes a pair of parallel leaf spring members, each secured at respective opposite ends thereof to said housing and at their respective other opposite ends thereof to said control plate, and a bowed leaf spring member intermediate said pair of parallel leaf spring members and connected at opposite ends thereof to the respective control plate-connected ends of said pair of parallel leaf spring members, and said pushrod contacting the center portion of said bowed leaf spring member.

5. The viscous fluid clutch described in claim 3, wherein said abutment means comprises a plurality of equally-spaced arcuate segments formed a predetermined spaced distance radially outwardly of said clutch plate and extending a predetermined distance past the face of said clutch plate facing said control plate so as to be contacted by said control plate.

6. The viscous fluid clutch described in claim 3, wherein said abutment means comprises a cylindrical flange formed on the outer peripheral edge of said control plate radially outwardly of the outer peripheral surface of said clutch plate and radially inwardly of the adjacent inner peripheral surface of said housing for contacting a wall of said housing.

7. A viscous fluid clutch comprising a relatively rotatable housing and clutch plate, said housing forming an annular enclosed working chamber, a predetermined volume of viscous fluid medium in said working chamber, said clutch plate being mounted in said working chamber, a control plate mounted in said working chamber and connected to said housing for rotation therewith and being axially movable with respect thereto, resilient means interconnecting said housing and said control plate and urging said control plate away from said clutch plate, said resilient means including a pair of parallel leaf spring members, each secured at respective opposite ends thereof to said housing and at their other respective opposite ends thereof to said control plate, and a bowed leaf spring member intermediate said pair of parallel leaf spring members and connected at opposite ends thereof to the respective control plate-connected ends of said pair of parallel leaf spring members, a wax-filled power element mounted on said housing and a pushrod extending from said power element into contact with the center portion of said bowed leaf spring member, and reciprocally operable in response to changes in ambient temperature to contact said resilient means and thereby urge said control plate toward said clutch plate, and abutment means formed on said housing in said working chamber for stopping the movement of said control plate adjacent said clutch plate so as to form a fluid shear space therebetween, said abutment means permitting fluid displaced by said temperature-responsive movement of said control plate to flow past said control plate so that said viscous fluid medium maintains a substantially constant fluid level in said working chamber for all axial positions of said control plate, said abutment means including a plurality of equally-spaced arcuate segments formed a predetermined spaced distance radially outwardly of said clutch plate and extending a predetermined distance past the face of said clutch plate facing said control plate so as to be contacted by said control plate.

8. A viscous fluid clutch comprising a relatively rotatable housing and clutch plate, said housing forming an annular enclosed working chamber, a predetermined volume of viscous fluid medium in said working chamber, said clutch plate being mounted in said working chamber, a control plate mounted in said working chamber and connected to said housing for rotation therewith and being axially movable with respect thereto, resilient means interconnecting said housing and said control plate and urging said control plate away from said clutch plate, said resilient means including a pair of parallel leaf spring members, each secured at respective opposite ends thereof to said housing and at their other respective opposite ends thereof to said control plate, and a bowed leaf spring member intermediate said pair of parallel leaf spring members and connected at opposite ends thereof to the respective control plate-connected ends of said pair of parallel leaf spring members, a wax-filled power element mounted on said housing and a pushrod extending from said power element into contact with the center portion of said bowed leaf spring member, and reciprocally operable in response to changes in ambient temperature to contact said resilient means and thereby urge said control plate toward said clutch plate, and abutment means formed on said control plate in said working chamber for abutting againSt said housing to stop the movement of said control plate adjacent said clutch plate so as to form a fluid shear space therebetween, said abutment means permitting fluid displaced by said temperature-responsive movement of said control plate to flow past said control plate so that said viscous fluid medium maintains a substantially constant fluid level in said working chamber for all axial positions of said control plate, said abutment means including a cylindrical flange formed on the outer peripheral edge of said control plate radially outwardly of the outer peripheral surface of said clutch plate and radially inwardly of the adjacent inner peripheral surface of said housing for contacting a wall of said housing.

* * * * *